United States Patent Office 3,468,760
Patented Sept. 23, 1969

3,468,760
METHOD FOR OBTAINING UROKINASE
Alfred Joss, Denens, Vaud, Switzerland, assignor to Pharmexbio A.G., Solothurn, Switzerland
No Drawing. Filed June 25, 1965, Ser. No. 467,100
Claims priority, application Switzerland, July 1, 1964, 8,618/64
Int. Cl. C07g 7/02
U.S. Cl. 195—66                    6 Claims

ABSTRACT OF THE DISCLOSURE

Method for purifying a crude urokinase solution which involves adding to a crude urokinase solution a water soluble acridine dye, such as 2-ethoxy-6,9-diamino acridine lactate until completion of precipitation, thereby precipitating all organic substances except urokinase and separating the precipitate from the thus purified urokinase solution.

---

The present invention is directed to a method for obtaining urokinase from a solution of crude urokinase containing impurities.

Urokinase is a known enzyme occurring in small amounts in human urine; it can be used as a medicament for sudden fibrinolytic disturbances (blood clots, thromboses, coronary infarcts).

It is also known that urokinase is an activator to convert plasminogen (profibrinolysin) obtained from human blood to plasmin (fibrinolysin). Plasmin is a fibrinolytic product which is known to dissolve blood clots.

Methods for obtaining crude urokinase solutions from urine are described in the following references:

(1) Sgouris and McCall, Am. J. Card. 6, Symposium on Fibrinolysin, 406 (1960); this method involves adsorption on barium sulphate.

(2) Celander and Guest, Am. J. Card. 6, Symposium on Fibrinolysin, 409 (1960); this method involves adsorption on DEAE-cellulose.

(3) Singher et al., U.S. Patent 2,961,382; this method involves separation by precipitation with heavy metals.

(4) Plough and Kjeldgaard, Biochem. & Biophys. Acta 24, 278 (1957); this method involves adsorption on silicic acid.

(5) Sgouris et al., Vox Sanguinis 7, 739 (1962); this method involves adsorption on phosphorylated cellulose.

To obtain the crude urokinase solution, preferably the last mentioned method of Sgouris is used. According to this method, human urine is first treated with a strongly basic cation-exchanger, especially with phosphorylated cellulose having a phosphorous content of more than 10%, so as to adsorb proteins including urokinase and impurities, whereafter the adsorbed substances are eluded from the cation-exchanger to obtain a crude urokinase solution containing impurities.

It is an object of the present invention to obtain urokinase of high purity from a crude urokinase solution obtained by one of those known methods or by any other method. The method according to the invention comprises treating the crude urokinase solution with a precipitating agent which precipitates substantially all organic matter except urokinase, separating the precipitation, and recovering the urokinase from the remaining solution.

As a precipitating agent, preferably a water soluble acridine dye salt is used, especially 2-ethoxy-6,9-diamino-acridine-lactate (Rivanol) or any other water soluble salt thereof or a similarly structured dye, such as of 3,6-diamino-10-methyl-acridine (Acriflavin) or of 3,6-tetramethyldiamino-acridine (Acridine-orange). Other usable acridine dyes are those mentioned in Römpp, Chemie Lexikon (5th ed., 1962) pages 34–35, in Schultz, Farbstofftabellen (Berlin 1914) pages 206–208, in Fierz, Künstliche organische Farbstoffe (Berlin 1926) pages 378–386, or in H. R. Schweizer, Künstliche organische Farbstoffe und ihre Zwischenprodukte.

The precipitation is advantageously carried out with an excess of the acridine dye salt and, after the filtration of the precipitate, the excess dye salt is removed by an adsorbant, e.g. charcoal or a molecular sieve which retains only the dye salt or only the urokinase. In the latter case, the urokinase must be eluted from the molecular sieve. Suitable molecular sieves are, for example, the dextran derivatives commercially available under the trademark "Sephadex." The excess dye salt can also be precipitated by addition of 5% to 7%, preferably 6% (weight/vol.) of solid sodium chloride to the urokinase solution.

The addition of an excess of the dye salt is advantageous because in this way all impurities can be safely precipitated. Preferably the dye salt is added in small amounts either in solid form or as an aqueous solution to the crude urokinase solution until no more precipitation can be observed.

If an adsorbant, such as charcoal, is used to remove the excess dye salt, then urokinase actually adsorbed on the adsorbant may be eluted by washing with a 0.25 to 1.0 molar NaCl solution.

Example 1

Fresh urine from young athletic men in good health is adjusted during collection to a pH of 7.8 by means of sodium hydroxide. 1 kg. of phosphorylated beechtree cellulose (with a phosphorous content of more than 10%) is added under stirring to 100 liters of fresh urine thus collected. By adding 5 N HCl, the pH is shifted to $3.5\pm0.1$. Within a short time, the suspension thus obtained is sucked over a nylon filter in a Buechner-funnel of 30-cm. diameter, and washed with distilled water until the latter comes out clear. The filter cake may be deep-frozen for storage.

The filter cake obtained from 100 liters of urine and 1 kg. of phosphorylated cellulose is eluted by letting it stand for 24 hours with 6 liters of 3% ammonia solution. Thereafter, the filter cake is sucked off over a nylon filter and then washed with 6 liters of distilled water. The pH of the filtrate thus obtained is $11.2\pm0.1$.

By adding 20% (weight/vol.) sodium chloride solution and adjusting the pH to $1.5\pm0.5$ with 5 N hydrochloric acid, a flocky precipitate is obtained. Centrifugation of this precipitate gives about 150 g. of a grey to brownish coloured paste.

This paste is suspended in 125 ml. of distilled water, whereby the pH is then $2.5\pm0.1$. By adding 1 N sodium hydroxide (about 10 to 20 ml.) dropwise, the pH is adjusted to $8.0\pm0.05$. The urokinase present and a substantial part of the impurities are thereby dissolved.

The obtained brownish-red suspension is dialysed until the dialysate shows no further chloride reaction with N/10 silver nitrate.

By adding 250 ml. of a 0.5% aqueous solution of 2-ethoxy-6,9-diamino-acridine lactate, a flocky precipitation is obtained, which is centrifuged off. The urokinase solution obtained by centrifuging for 30 minutes at 4000 r.p.m. is treated with 2.0 g. charcoal to remove excess acridine dye salt. After removing the charcoal by filtration and washing it with 50 ml. 0.5 M sodium chloride solution, the water-clear filtrate is dialysed to remove electrolytes and thereafter sterilized. Thus, about 100 mg. of urokinase are obtained with an activity of about 1500 Plough units per mg. The sterilization can, for instance, be effected by lyophylization or by means of β-propiolactone, or also by any other known method.

Example 2

Example 1 is repeated, but in place of 2-ethoxy-6,9-diamino-acridine lactate, the same amount of 3,6-diamino-10-methyl-acridine lactate, the same amount of 3,6-diamino-10-methyl-acridine chloride is used, whereby the excess dye salt is not removed with charcoal, but with a molecular sieve on a dextran basis (commercially available under the trademark "Sephadex G25").

Example 3

Example 2 is repeated, but 3,6-tetramethyl-diamino-acridine chloride is used as the dye salt.

The activity of the urokinase obtainable according to the invention may amount to 3000 Plough units per mg., or even more. The yield in urokinase is about 80 to 90% of the units originally present in the urine used. However, it is to be noted that the yield and activity of the urokinase obtained according to the invention depend to a great degree on the quality of the urine used or the crude urokinase respectively.

It is possible to use the dialised and sterilised solution of the pure urokinase directly for therapeutic purposes.

What I claim is:

1. A method for purifying a crude urokinase solution, comprising adding to said crude urokinase solution a water-soluble acridine dye salt until completion of precipitation, thereby precipitating out substantially all organic substances except urokinase, and separating the precipitate from the thus purified urokinase solution.

2. A method for purifying a crude urokinase solution, comprising adding to said crude solution a water-soluble acridine dye salt in a quantity in excess over that required for completion of precipitation, thereby precipitating out substantially all organic substances except urokinase; separating the precipitate from the urokinase solution and removing the excess acridine dye salt from the urokinase solution by means of an adsorbant.

3. A method for purifying a crude urokinase solution, comprising adding to said crude urokinase solution a water-soluble acridine dye salt in a quantity in excess over that required for completion of precipitation, thereby precipitating out substantially all organic substances except urokinase; separating the precipitate from the urokinase solution and removing the excess acridine dye salt from the urokinase solution by salting out.

4. A method according to claim 1 wherein the water soluble acridine dye salt is selected from the group consisting of 2-ethoxy-6,9-diamino acridine, 3,6-diamino-10-methyl-acridine and 3,6-tetramethyldiamino-acridine.

5. A method according to claim 2 wherein the water soluble acridine dye salt is selected from the group consisting of 2-ethoxy-6,9-diamino-acridine, 3,6-diamino-10-methyl-acridine, and 3,6-tetramethyldiamino-acridine.

6. A method according to claim 3 wherein the water soluble acridine dye salt is selected from the group consisting of 2-ethoxy-6,9-diamino-acridine, 3,6-diamino-10-methyl-acridine, and 3,6-tetramethyldiamino-acridine.

References Cited

UNITED STATES PATENTS

| | | | |
|---|---|---|---|
| 2,961,382 | 11/1960 | Singher et al. | 167—74.5 |
| 2,989,440 | 6/1961 | Singher et al. | 167—74.5 |
| 3,355,361 | 11/1967 | Lesuk | 195—62 |

OTHER REFERENCES

Chemical Abstracts (I), vol. 57, 1962, 3567c.
Chemical Abstracts (II), vol. 57, 1962, 5229b.
Chemical Abstracts (III), vol. 60, Feb. 3, 1964, 3345a.

LIONEL M. SHAPIRO, Primary Examiner

U.S. Cl. X.R.

424—99